US005662995A

United States Patent [19]

[11] Patent Number: 5,662,995

Sakurai et al.

[45] Date of Patent: Sep. 2, 1997

[54] TRANSFER PAPER FOR ELECTROPHOTOGRAPHY AND PROCESS FOR PRODUCING THE SAME

[75] Inventors: Kunio Sakurai; Tsukasa Matsuda; Kyoko Inoue, all of Kanagawa; Harumi Watanabe; Masaru Kato, both of Tokyo, all of Japan

[73] Assignee: Fuji Xerox Co., Ltd., Tokyo, Japan

[21] Appl. No.: 497,739

[22] Filed: Jul. 3, 1995

[30] Foreign Application Priority Data

| | | | |
|---|---|---|---|
| Jul. 4, 1994 | [JP] | Japan | 6-152305 |
| Aug. 12, 1994 | [JP] | Japan | 6-190420 |
| Oct. 28, 1994 | [JP] | Japan | 6-265416 |
| Oct. 28, 1994 | [JP] | Japan | 6-265417 |

[51] Int. Cl.[6] B32B 3/26

[52] U.S. Cl. 428/304.4; 428/195; 428/211; 428/219; 428/323; 428/340; 428/342; 428/409; 428/537.5

[58] Field of Search 428/174, 195, 428/219, 340, 342, 402, 204, 537.5, 304.4, 211, 323, 409; 162/70

[56] References Cited

FOREIGN PATENT DOCUMENTS

| | | |
|---|---|---|
| 0 621 510 A1 | 10/1994 | European Pat. Off. . |
| 62-198877 | 9/1987 | Japan . |
| 62-198876 | 9/1987 | Japan . |
| 3-161760 | 7/1991 | Japan . |
| 3-180599 | 8/1991 | Japan . |
| 3-242654 | 10/1991 | Japan . |
| 3-294600 | 12/1991 | Japan . |
| 3294600 | 12/1991 | Japan . |
| 4-291351 | 10/1992 | Japan . |
| 5-53363 | 3/1993 | Japan . |
| 5241366 | 9/1993 | Japan . |
| 6073699 | 3/1994 | Japan . |

*Primary Examiner*—William Krynski
*Attorney, Agent, or Firm*—Finnegan, Henderson, Farabow, Garrett & Dunner, L.L.P.

[57] ABSTRACT

Transfer paper for electrophotography of the present invention includes base paper; and a coating layer provided on at least one side of the base paper. The coating layer includes a pigment and a binder, has a solids content in the range of 2 to 10 g/m$^2$, and has void-free areas containing no voids having a circle-equivalent diameter of equal to or more than 1 μm and void area containing voids whose circle-equivalent diameter is equal to or more than 1 μm. A proportion of void areas whose equivalent circle diameter is more than 20 μm is not more than 2%, and the average equivalent circle diameter of the void areas and that of the void-free areas as observed on the surface of the coating layer satisfy at least one of the following conditions: (1) the average equivalent circle diameter of the void areas and that of the void-free areas are each from 1.5 to 10 μm; (2) the average equivalent circle diameter of the void areas and that of the void-free areas are each 0.2 to 1.5 times the volume average particle size of the toner used for image formation; and (3) the average equivalent circle diameter of the void areas is from 1.0 to 10.0 μm and that of the void-free area is from 1.5 to 10 μm.

18 Claims, 2 Drawing Sheets

TRANSFER PAPER FOR ELECTROPHOTOGRAPHY AND PROCESS FOR PRODUCING THE SAME

BACKGROUND OF THE INVENTION

1. Field of the Invention

This invention relates to transfer paper to be used in full-color or monochromatic copying machines and printers using an indirect dry electrophotography and a process for producing the same.

2. Description of the Related Art

High definition of electrophotographic systems has been studied in cope with the development of color copying machines and printers, and digitalization of these systems. In particular, digitalization of input and output information has advanced for obtaining a high quality image with a full-color electrophotographic copying machine or printer and brought about great improvements in imaging (input), image processing, development, transfer, fixing, and the like. Developers and photoreceptors have also been improved in conformity with the progress of digitalization, high definition, and high color development recording.

However, conventional transfer paper which has been used in electrophotographic monochromatic copying machines and printers is unsatisfactory for use in the thus advanced electrophotographic full-color copying machines or printers. That is, the color image formed on the conventional transfer paper has poor graininess in the halftone which is often contained in photographs, suffers from fine unevenness of gloss or density over the halftone to solid area, and also suffers from mottles (density unevenness appearing in specks) in the halftone to solid area.

In order to improve image-forming properties of coated paper for use in indirect dry electrophotographic recording, smoothing of coated paper so as to give controlled air permeability or addition of a non-film-forming resin to a coating layer so as to prevent such image defects as blisters has been proposed (see JP-A-62-198876, and JP-A-3-294600, the term "JP-A" as used herein means an "Unexamined Japanese Patent Publication"). For the purpose of preventing transfer deficiency under a high humidity condition, it has been proposed to control the surface resistivity of coated paper under a high humidity condition above a given level (see JP-A-62-198877) or to use a special emulsion type adhesive in the coating layer (see JP-A-3-242654). Further, coated paper providing a high quality image with high gloss has been proposed, in which specific calcium carbonate is used as a pigment in the coating layer, the coating layer has as small a solids content as 3.5 g/m$^2$ or less, and the coated surface has a smoothness above a given level by smoothing treatment (see JP-A-4-291351).

However, any of the above-cited publications makes no mention of improvement on graininess in the halftone. It turned out that the toner transferred to the coated paper according to these techniques is extended or spread by the thermal fixing roll. In the case of the coated paper having a small coating thickness, the toner image also tends to be extended by the thermal fixing roll and, in addition, the fibers exposed on the coating layer because of the small coating thickness disturb the image to reduce the graininess.

Also with respect to non-coated paper, various proposals have been made. For examples, it has been proposed to increase smoothness in order to accomplish high image quality (see JP-A-3-131760), to reduce the CSF (Canadian standard freeness) of the pulp of the skin layer in order to improve image quality and dimensional stability (see JP-A-3-180599), or to incorporate a certain kind of polyester particles into the stock in order to improve transfer properties at high humidity (see JP-A-3-186855).

Notwithstanding these manipulations, fibers on the surface of non-coated paper still exert adverse influences on image quality. That is, any of these proposals is not so effective on improvement of graininess in the middle tone of the transferred image or on elimination of fine unevenness of gloss or density in the halftone to solid area of the image.

Mottling or graininess in halftone to solid image areas has been found by the present inventors for the first time to be an image defect which occurs when an image composed of halftone to solid areas for the most part, such as a photographic image, is electrophotographically printed on conventional transfer paper by use of the aforesaid advanced full-color copying machine or printer. This image defect differs from any of the conventionally indicated problems, such as transfer deficiency at high humidity (see JP-A-62-198877, JP-A-5-53363), reduction in density at low humidity and the image defect due to scattering of a toner (JP-A-5-53363), and transfer deficiency due to surface roughness of transfer paper (JP-A-4-291351). There is no report of the problem of mottles still less proposal of means for preventing mottles.

SUMMARY OF THE INVENTION

It is an object of the present invention is to provide transfer paper for electrophotography which provides a high quality image excellent in graininess in the halftone and suffering from neither fine unevenness of gloss or density nor mottling in the halftone to solid area even on a digital full-color copying machine or printer using an indirect dry electrophotographic system.

It is another object of the present invention is to provide a process for producing the above-described transfer paper.

The transfer paper according to the present invention is composed of a base paper having provided on at least one side thereof 2 to 10 g/m$^2$ per side, on a solid basis, of a coating layer comprising a pigment and a binder, the coating layer being composed of void-free areas containing no voids having a equivalent circle diameter of 1 μm or greater and void areas containing voids whose equivalent circle diameter is not less than 1 μm, in which the proportion of void areas whose equivalent circle diameter is more than 20 μm is not more than 2% and the equivalent circle diameter of the void areas and that of the void-free areas as observed on the surface of the coating layer satisfy at least one of the following conditions: (1) the average equivalent circle diameter of the void areas and that of the void-free areas are each from 1.5 to 10 μm; (2) the average equivalent circle diameter of the void areas and that of the void-free areas are each 0.2 to 1.5 times the volume average particle size of the toner used for image formation; and (3) the average equivalent circle diameter of the void areas is from 1.0 to 10.0 μm and that of the void-free areas is from 1.5 to 10 μm.

DETAILED DESCRIPTION OF THE INVENTION

Figure 1:
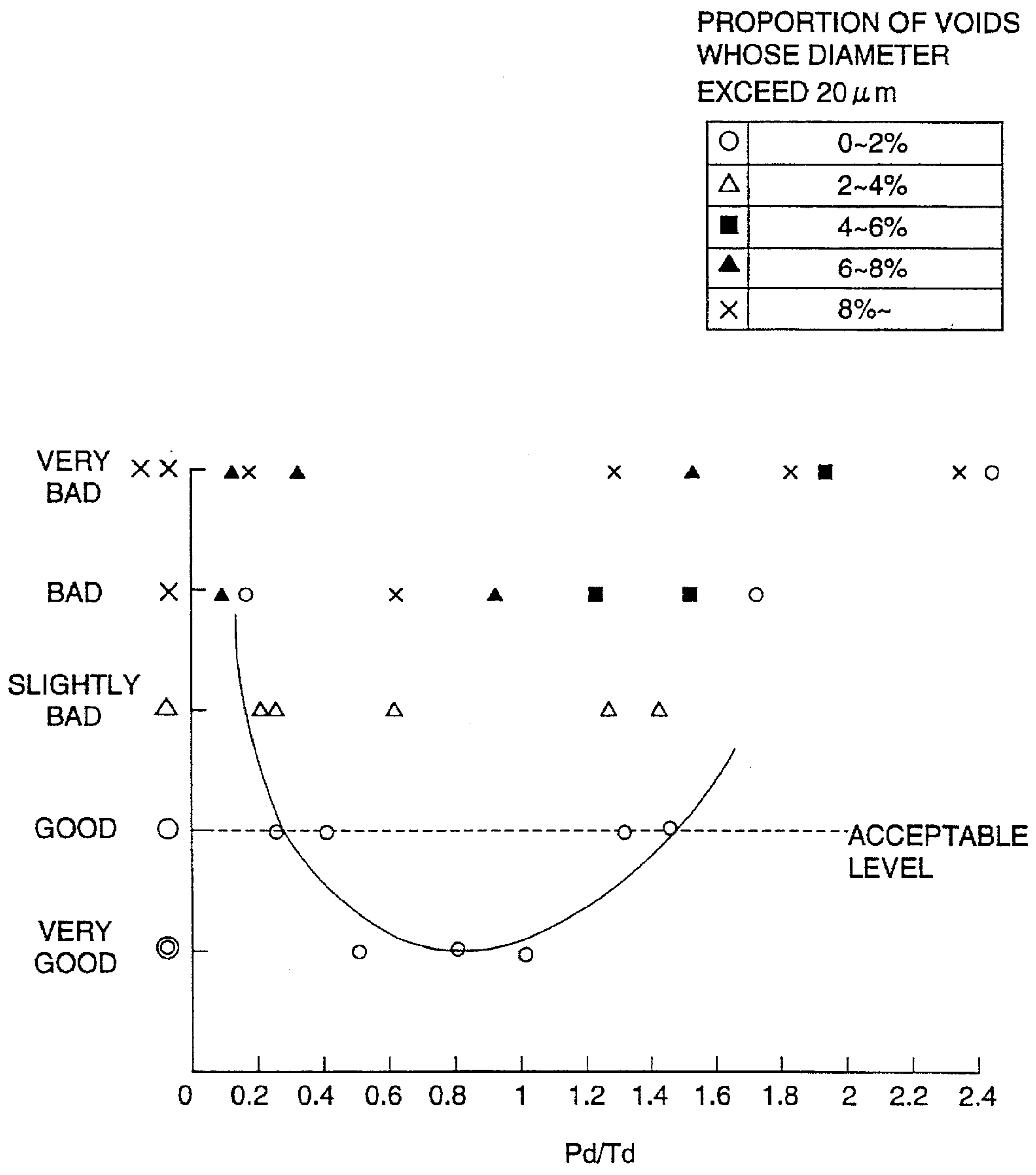
FIG. 1 is a graph showing a relationship between a Pd/Td ratio of a coating layer of transfer paper and graininess in the halftone of an image formed thereon, wherein Pd is an average equivalent circle diameter of voids and Td is a volume average particle size of a toner.

The detailed description of the present invention will be described in detail as follows.

The present inventors have studied the causes of deterioration of graininess in the middle tone, fine unevenness of gloss or density in the halftone to solid area, and mottles in the halftone to solid area of an image formed on conventional coated or non-coated transfer paper in a digital full-color and monochromatic indirect dry electrophotographic recording system so as to solve the conventional problems.

The inventors have found that, in the case of non-coated paper, fibers exposed on the surface of the paper form irregular and coarse voids cause cutting of a line image or a dot image at the time of transfer or fixing, or cause the molten toner to run along the fibers, thus making the line or dot image irregular and, in particular, deteriorating the graininess in the halftone.

Where toner is transferred to non-coated paper with fibers irregularly exposed thereon, there is a difference between the heating effect exerted on the toner transferred on the exposed fibers and that exerted on the toner transferred into the depressions among the fibers. That is, the toner on the fibers is sufficiently heated and melted to give high gloss, whereas the toner in the depressions is not sufficiently heated due to insufficient contact with the fixing roll, resulting in low gloss. Further, the molten toner runs into the depressions among fibers, causing non-uniform distribution of the toner on the surface of paper. After fixing, it follows that fine unevenness of gloss or density occurs particularly in the middle tone to solid image area.

In the case of using commercially available coated paper for printing or coated paper for electrophotography, the transferred toner image, on being melt-fixed, hardly penetrates into the coating layer but spreads horizontally on the coated surface and partly joins the neighboring lines or dots to cause noises in the middle tone, thereby resulting in deterioration of graininess.

According to microscopic observation of the surface and cut section of conventional coated paper for printing or electrophotography, the void areas on the surface and inside of the coating layer have an average diameter on the order of 0.1 μm or even smaller. Due to such a small void area size on the surface and inside of the coating layer, the molten toner cannot penetrate into the coating layer at the time of fixing but only spreads horizontally, resulting in deterioration of graininess.

Transfer paper having a surface resistivity higher than $5\times10^{11}$ Ω as measured according to JIS K6911 causes scattering of toner when it is stripped off the photoreceptor in a low humidity environment, which disturbs lines or dots to deteriorate graininess. Also, transfer paper having a surface resistivity lower than $1\times10^{9}$ Ω, on the other hand, does not accomplish sufficient toner transfer in a high humidity environment, also resulting in disturbance of lines or dots, deterioration of graininess, and unevenness of density.

Further, mottles in the halftone to solid image area occur as follows irrespective of coated paper or non-coated paper. Non-coated paper having a formation index of less than 20 or coated paper whose base paper has a formation index of less than 20 has poor texture. That is, the paper shows considerable local variation in basis weight and forms flocks (masses of fluffy fibers) on the areas having an increased basis weight. The area with flocks (hereinafter referred to as flock area) and the area with no flock (hereinafter referred to as non-flock area) have different permittivities. The former has a higher permittivity because of its substance (fibers), while the latter has a lower permittivity due to much air layer contained. The difference in permittivity produces a difference in intensity of the electrical field for transfer so that the rate of toner transfer varies between the flock area and the non-flock area, thus causing mottles in the middle tone to solid image area.

If the base paper has an apparent density of less than 0.8 g/cm$^3$ (JIS P8118), the difference in distribution of flock areas and non-flock areas (texture) tends to become great, and the paper contains large voids among fibers and much air in the inside even with few large flock areas so that the permittivity becomes non-uniform to make differences in intensity of electrical field for transfer, thus also causing mottles in the halftone to solid image area.

Transfer paper having a water content exceeding 6% tends to suffer from non-uniform distribution of water content in the coating layer or base paper. The area with a higher water content has a higher permittivity, while the area with a lower water content has a lower permittivity. Similarly to the variation in texture, the variations of permittivity, surface resistivity or volume resistivity lead to differences in electrical field intensity, which leads to variation in rate of transfer of toner, resulting in mottling in the middle tone to solid image area.

In the light of the above-described causes and results, the inventors aimed at (1) preventing fibers on the surface of paper from forming coarse voids in order to prevent cutting of a line or dot image, (2) distributing, on the surface of the coating layer, voids having such a size that allows molten toner to moderately penetrate into the coating layer at the time of fixing as uniformly as possible in order to prevent spread of the toner image, and (3) improving the texture of basis paper, increasing the apparent density of basis paper, and controlling the water content in the final product in order to prevent non-uniform distribution of permittivity. The present invention surprisingly solves not only the problems known in the art of transfer paper, i.e., deterioration of graininess in the halftone and fine unevenness of gloss or density in the halftone to solid image area, but the problem of mottling or graininess occurring in the halftone to solid image area.

It is essential that the voids formed in the coating layer should be such that a molten toner penetrates therethrough to a moderate degree but not to an excessive degree. It has been found that excellent image quality can be obtained when void-free areas containing no voids having equivalent circle diameter of not less than 1 μm as observed on the surface of a coating layer and void areas containing voids whose equivalent circle diameter is not less than 1 μm as similarly observed each have an average equivalent circle diameter of from 1.5 to 10 μm, preferably 2 to 8 μm. It has also been found that uniformity of the void structure can be assured to prevent deterioration of graininess and fine unevenness of gloss or density when the proportion of void areas whose circle-equivalent diameter is more than 20 μm is controlled not to exceed 2%. In order to form a coating layer so as to level the projections or depressions formed by fibers, the coating layer should have a solids content of 2 to 10 g/m$^2$ per side.

It has been further found that mottling graininess in the halftone to solid image area can be prevented when transfer paper has a formation index of not less than 20, preferably not less than 25.

It has been furthermore found that more excellent image quality can be obtained by adjusting the surface resistivity of transfer paper within a range of from $1\times10^9$ to $5\times10^{11}$ Ω.

It has been furthermost found that mottling or graininess in the halftone to solid area can be prevented by adjusting the apparent density of the base paper at 0.8 $g/cm^3$ or higher, preferably not more than 1.1 $g/cm^3$, and by adjusting the water content of the product at 6% or less, preferably in a range of 3.5 to 5.5%.

The present invention has been accomplished based on these findings.

For measurement of void areas and void-free areas of the coating layer, the surface structure of the coating layer was observed with high fidelity under a field emission type scanning electron microscope (hereinafter abbreviated as FE-SEM). For stereoscopic observation of the surface structure, a sample was irradiated with electron rays at a fixed angle of 45°, and a micrograph was taken at a magnification of 1000. The void areas and void-free areas were traced by a digitizer and processed with an image analyzer to obtain equivalent circle diameter of the void areas and void-free areas. To avoid imbalance of data, the measurement was made on 50 arbitrarily selected points per sample (total area of measurement: 0.5 $mm^2$) to obtain an average equivalent circle diameter of void areas and void-free areas of the coating layer per 0.5 $mm^2$.

The formation index of base paper was measured with a 3D sheet analyzer M/K950, manufactured by M/K Systems, Inc., with its diaphragm set at 1.5 mm diameter. Measurement can be made by attaching a sample to a rotary drum of the 3D analyzer and detecting local differences in basis weight in terms of differences in amount of light by means of a light source fitted on the drum axis and a corresponding photo detector placed outside the drum. The range of measurement was adjusted by the diameter of the diaphragm attached to the receptor part of the photo detector. The differences in amount of light (deviation) were amplified, converted to digital data, and classified into 64 classes of basis weight. 100,000 data were obtained by scanning once, and the data were depicted in a frequency histogram. The maximum frequency in the histogram was divided by the number of classes having a frequency of 100 or more, and 1/100 of the quotient was taken as an index of formation. The greater the index of formation, the better the texture.

Returning to the moderate penetrability of a molten toner through the coating layer, the inventors have studied the relationship between the size of toner particles and the size of the voids on the surface of the coating layer.

Test coated paper having a varied ratio of void size (circle-equivalent diameter of a void; Pd) to toner particle size (volume average diameter; Td) was prepared, and the toner image formed on the paper was observed with the naked eye and graded by graininess according to the following standard. The relationship between a Pd/Td ratio and graininess is shown in FIG. 1.

STANDARD OF LEVEL OF GRAININESS

⊚ . . . Very good
o . . . Good (acceptable)
Δ . . . Slightly bad
x . . . Bad
xx . . . Very bad As is apparent from FIG. 1, transfer paper having on its coating layer voids whose equivalent circle diameter is 0.2 to 1.5 times as long as the volume average diameter of toner particles provides excellent graininess. It is also seen that if the proportion of void areas whose equivalent circle diameter is more than 20 μm in the coating layer exceeds 2%, the image does not have satisfactory graininess even with the Pd/Td ratio falling with the above-described range.

From the above results, it is seen that the above-described effects can be exhibited when the average equivalent circle diameter of void areas and that of the void-free areas are each 0.2 to 1.5 times, preferably 0.6 to 1.2 times, the volume average diameter of toner particles and void areas and void-free areas alternate on the plane of the coating layer.

It has also been found that more excellent image quality can be obtained when the average equivalent circle diameter of void areas is from 1.0 to 10.0 μm and that of void-free areas is from 1.5 to 10 μm, preferably when both the void areas and void-free areas have an average equivalent circle diameter of 2 to 8 μm.

It has also been found that uniformity of the void structure can be assured to prevent deterioration of graininess and fine unevenness of gloss or density when the proportion of void areas whose equivalent circle diameter is more than 20 μm is controlled not to exceed 2%.

In order to form a coating layer so as to level the projections or depressions formed by fibers, the coating layer should have a solids content of not less than 2 $g/m^2$, preferably 3.5 to 10 $g/m^2$, per side.

It has also been found that more excellent image quality can be obtained by adjusting the surface resistivity of transfer paper in a range of from $1\times10^9$ to $5\times10^{11}$ Ω, preferably $2\times10^9$ to $1\times10^{11}$ Ω.

Measurement of volume average particle size of toner particles was made with a Coulter counter to obtain a volume particle size distribution, from which an average diameter ($d_{50}$) was obtained.

Further, the inventors have noted pigments particles in connection with improvement on the above-described image defects and developed a coating layer structure which is freed of coarse and irregular voids formed by fibers as observed on the surface of non-coated paper and which permits moderate penetration of a molten toner at the time of fixing while preventing spread of the molten toner as has been observed on conventional coated paper having only very fine voids.

Figure 2:
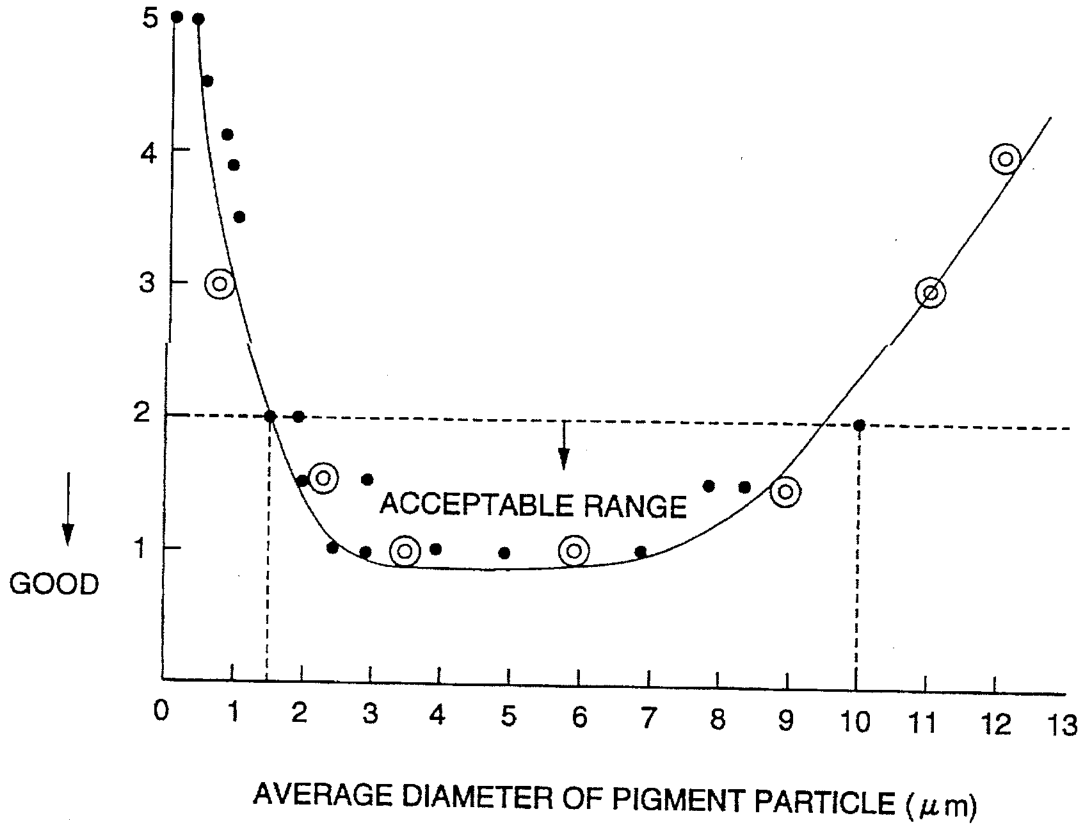
FIG. 2 is a graph showing the relationship between an average particle size of the pigment of a coating layer and graininess in the halftone of an image formed thereon.

The influences of the size and shape of pigment particles were examined as follows. Commercially available neutral paper having a basis weight of 82.0 $g/m^2$ and an apparent density of 0.82 $g/cm^3$ was coated with 0.1 $g/m^2$ NaCl to prepare base paper. In 100 parts by weight of water was dissolved 0.05 part by weight of sodium polyphosphate as a dispersant, and 100 parts by weight of calcium carbonate or silica having a varied average particle size was added thereto to prepare pigment dispersion. To the pigment dispersion were added 15 parts of a styrene/butadiene rubber latex (SBR) as a binder and 5 parts by weight of polyvinyl alcohol (PVA) to prepare a coating composition. The composition was applied to the base paper to a coating weight selected from a range of from 4 to 8 $g/m^2$ per side on a solid basis so that the average diameter of the voids among pigment particles may be the same as or smaller than the average particle size of the pigment particles by not more than 1 μm. A 3×3 cm patch having a 50% image area ratio was printed in green on the resulting coated paper using A Color 635 manufactured by Fuji Xerox Co., Ltd. The graininess of the resulting middle tone image was visually observed and graded by two panel members, and the average grade was plotted against average particle size of pigment particles as shown in FIG. 2. The term "pigment particles" as used herein includes primary particles, secondary particles, and agglomerates formed of the primary particles and secondary particles via a binder, etc. In FIG. 2, solid bullets indicate calcium carbonate, and double circles silica.

As is apparent from FIG. 2, pigment particles should have an average particle size of 1.5 to 10 μm, preferably 2.0 to 8.0 μm, in order to assure desired graininess. The average diameter of the voids formed by the pigment particles ranges from 1.0 to 10.0 μm, preferably from 1.5 to 10 μm, and is within a range of ±2 μm of the average particle size of the pigment particles.

If the average particle size of the pigment particles is less than 1.5 μm, voids are hardly formed among pigment particles, making it difficult for a molten toner to penetrate along the pigment particles, resulting in deterioration of image quality. If the average particle size exceeds 10 μm, penetration of a molten toner along the pigment particles becomes excessive, and the voids among the particles become too large, leading to reduction in gloss and deterioration of graininess.

If the average diameter of the voids formed by the pigment particles is less than 1.0 μm, the molten toner cannot penetrate to a moderate degree even in using large pigment particles. A void diameter exceeding 10 μm leads to reduction in gloss and deterioration of graininess. When the average diameter of the voids falls within a range of from 1.5 to 10.0 μm and also within ±2.0 μm of the average particle size of the pigment particles, a molten toner shows proper penetration into the coating layer with little scatter in degree of penetration thereby providing excellent graininess.

In order to form a coating layer so as to level the projections or depressions formed by fibers, the coating layer composed of the above-mentioned pigment particles and voids should have a solid content of not less than 2 g/m$^2$, preferably 3.5 to 10 g/m$^2$, per single side. If the solid content is less than 2 g/m$^2$, graininess of the middle tone is deteriorated, and fine unevenness of gloss or density results in the high image density area. If the solid content exceeds 10 g/m$^2$, pigment particles tend to fall off the coated paper, or transfer unevenness tends to result.

It has been found that the average particle size of pigment particles, the average diameter of voids formed by the pigment particles, and the average volume of the voids are proportional to the 75° specular gloss specified in JIS P8142 and also proportional to graininess and fine unevenness of gloss and density. Specifically, the surface structure of the coating layer preferably has a 75° specular gloss of 1 to 15%, still preferably 1 to 12%. It was confirmed that if the surface is finished to have a 75° specular gloss exceeding 15%, the pigment particles are squashed to reduce the diameter and volume of voids, resulting in deterioration of graininess and fine unevenness of gloss and density. If the gloss is lower than 1%, the surfaces feels too rough, and the image quality is reduced.

While not limiting, the void-forming pigment particles preferably have a spherical or spindle-like shape. It should be noted, however, that those pigments having a sheet structure or a structure built up by tabular crystals, such as kaolin and talc, are less capable of forming voids and tend to block the voids formed by other pigment particles. Therefore, the proportion of such pigments is preferably not more than 70% by weight, still preferably not more than 60% by weight, based on the total pigments.

More excellent image quality can be obtained by adjusting the surface resistivity of the coated paper in a range of from $2\times10^9$ to $5\times10^{11}$ Ω.

For measurement of the above-mentioned particle size of pigment particles as well as the size of the void areas and void-free areas of the coating layer, the above-mentioned FE-SEM was used in the same manner as described above.

The base paper which can be used in the present invention is not particularly limited. Usable base paper includes well-known acidic or neutral fine quality paper, medium quality paper, woody paper, regenerated paper, synthetic paper and the like. Polyethylene terephthalate films, polysulfone films, polyphenylene oxide films, polyimide films, polycarbonate films, cellulose ester films and the like which has a thermal resistant temperature of not lower than 100° C. are also useful as a base paper.

Pulp which can be used in the base paper include chemical pulp, such as LBKP (hardwood bleached kraft pulp), NBKP (softwood bleached kraft pulp), LBSP (hardwood bleached sulfite pulp), and NBSP (softwood bleached sulfite pulp). Since softwood pulp such as NBKP and NBSP has a long fiber length, it tends to form flocks and deteriorate the texture. It is preferable therefore that softwood pulp be used in combination with not less than 80% of LBKP based on the total pulp. For curl control after copying or printing, the transfer paper preferably has stiffness.

High yield pulp, such as nonwood pulp (e.g., cotton pulp), wastepaper pulp, ground pulp, and thermomechanical pulp, may be used either alone or in combination with other pulp while taking into consideration the degree of deterioration of texture and degree of reduction in whiteness after coating.

For the purpose of increasing the whiteness after coating, the material of base paper is properly selected from the above-described kinds of pulp, or pulp prepared by intensified bleaching may be used, or a fluorescent dye may be incorporated into a pulp slurry.

The base paper preferably includes fillers for increasing the density, controlling the surface smoothness, improving coating properties, and adjusting the opacity and whiteness after coating. Examples of suitable fillers include inorganic fillers, such as calcium carbonate including ground calcium carbonate, precipitated calcium carbonate, and chalk, and silicates, such as kaolin, calcined clay, bioloferrite, sericite, and talc, and titanium dioxide; and organic fillers, such as urea resins and styrene.

While not limiting, the filler is suitably used in an amount of 5 to 30% by weight, preferably 7 to 25% by weight. If the amount of the filler is less than 5% by weight, a treatment for increasing the density, for example, calendering hardly produces its effects, refraction of light due to the filler is reduced to reduce opacity, and the paper is too stiff for satisfactory running. If the amount of the filler exceeds 30% by weight, the stiffness of the paper is too weak for satisfactory running.

Internal sizes to be used in the base paper include a rosin size, a synthetic size, a petroleum resin size, and a neutral size. The size may be used in combination with an appropriate fixing agent for a size and fibers, such as aluminum sulfate or cationic starch. From the standpoint of paper preservability after copying or printing, a neutral size, especially an alkenyl succinic anhydride type size is preferred.

The base paper may contain organic or inorganic substances for surface resistivity adjustment, such as sodium chloride, potassium chloride, calcium chloride, sodium sulfate, zinc oxide, titanium dioxide, tin oxide, aluminum oxide, magnesium oxide, alkylphosphates, alkylsulfates, sodium sulfonates, and quaternary ammonium salts, or polymerized materials, either singly or as a combination thereof.

Methods for forming a coating layer having void areas include, while not limiting, a method of coating base paper with a binder having dispersed therein primary particles, or agglomerates of primary particles, of an organic or inorganic pigment or a pigment capable of expanding on drying and a method of making fine depressions in the surface of the coating layer during or after drying by means of sharp projections.

The base paper may further contain strengthening agents, dyes, pH adjusting agents, and the like.

Methods of paper making are not particularly restricted. For obtaining improved texture, a screen or an eddy screen may be provided in immediate front of a head box of a paper machine so that the flow of stuff may be regulated, or flocculation of stuff may be prevented by using dispersants, texture controlling additives, retentions, filter aids, and the like.

Various pigments commonly used in general coated paper can be used in the coating layer of the transfer paper according to the present invention. For example, mineral pigments, such as ground calcium carbonate, precipitated calcium carbonate, titanium dioxide, aluminum hydroxide, satin white, talc, calcium sulfate, barium sulfate, zinc oxide, magnesium oxide, magnesium carbonate, amorphous silica, colloidal silica, white carbon, kaolin, calcined kaolin, delaminate kaolin, aluminosilicates, sericite, bentonite, and smectite; and organic pigments, such as polystyrene resin fine particles, urea formalin resin fine particles, and fine hollow particles; either alone or as a combination of two or more thereof. The proportion of those pigments having a tabular crystal form or a structure built up by tabular crystals is preferably not more than 70% by weight, still preferably not more than 60% by weight, based on the total pigments.

The binder which can be used in the coating layer is selected from water-soluble binders, emulsions or latexes which exhibit high adhesion to the base paper and binding properties for pigments and other additives and cause no blocking, either alone or as a combination thereof. Suitable binders include water-soluble resins, such as PVA, modified PVA, starch derivatives, gelatin, casein, methyl cellulose, hydroxyethyl cellulose, acrylamide/acrylic ester copolymers, acrylamide/acrylic acid/methacrylic acid terpolymers, styrene/acrylate resins, isobutylene/maleic anhydride resins, and carboxymethyl cellulose; acrylic emulsions, vinyl acetate emulsions, vinylidene chloride emulsions, polyester emulsions, SBR, and acrylonitrile/butadiene latexes.

The binder is suitably used in an amount of from 5 to 230 parts by weight, preferably 7 to 200 parts by weight, per 100 parts by weight of the pigment. If the amount of the binder is less than 5 parts by weight, the film strength is reduced. If it exceeds 230 parts, voids of the coating layer are plugged with the binder, resulting in deterioration of the graininess in the middle tone.

In addition, the coating composition for the coating layer may contain dyes or colored pigments for color tone adjustment or fluorescent dyes for improvement of visual whiteness. The coating composition may further contain known materials used in the base paper for adjustment of electrical resistivity. For the purpose of facilitating preparation of the coating composition, various additives, such as dispersants, defoaming agents, plasticizers, pH adjusting agents, fluidity modifiers, solidification accelerators, waterproofing agents, and sizes, may be added to the composition.

The coating layer should have a solid content of from 2 to 10 g/m$^2$, preferably 3.5 to 10 g/m$^2$, per single side. If the solid content is less than 2 g/m$^2$, fibers on the entire surface of base paper cannot be covered completely, and the effects of improving graininess of the halftone, unevenness of gloss in high image density area, and unevenness of gloss or density in the halftone to solid image area are lessened. If the solid content exceeds 10 g/m$^2$, the paper is too stiff, tending to cause running disorders, or uniform application of the coating composition tends to be difficult. Further, it is difficult to control the diameter of voids and non-voids, failing to improve image quality such as graininess or gloss unevenness.

The coating composition can be applied by means of out-of-line coating machines, such as a blade coater, an air knife coater, a roll coater, a bar coater, a reverse-roll coater, a gravure coater, and a curtain coater, or in-line coating machines, such as a gate roll coater and a size press coater.

Smoothing treatment after coating can be carried out by means of a calender, a super calender, etc. to such a degree that the coating layer after drying may have an Oken's smoothness (hereinafter simply referred to smoothness) which is measured by Oken type smoothness tester of 20 to 300 seconds, preferably 30 to 200 seconds. If the smoothness is less than 20 seconds, transfer cannot be conducted satisfactorily. If the smoothness exceeds 300 seconds, the voids on the surface of the coating layer are collapsed, failing to exhibit the effects of improving image quality, and the transfer paper tends to suffer from blocking at high humidity.

While not limiting, the transfer paper according to the present invention preferably has a total basis weight of 64 to 110 g/m$^2$. Transfer paper whose basis weight is more than 110 g/m$^2$ tends to have insufficient heat conductivity at the time of fixing for melting a toner uniformly and sufficiently, resulting in melt unevenness, which would lead to unevenness of gloss or density in high image density area or fixing deficiency. Further, such transfer paper is too stiff and tends to cause running disorders. If the basis weight is less than 64 g/m$^2$, a toner tends to be excessively melted so that non-uniformity of penetration cannot be avoided completely even with manipulations on the coating layer structure, resulting in deterioration of graininess or increase of gloss unevenness.

The whiteness of the transfer paper is not particularly limited but, for use in full-color recording, is preferably not less than 80%, particularly not less than 82%, in terms of brightness by Hunter. If the whiteness is less than 80%, saturation and brightness of color images are reduced to reduce color reproducibility.

In order to prevent waving of the transfer paper or curling after copying, it is preferable to adjust the water content of the transfer paper by means of a paper machine and/or a drier or a calender, etc. so that the transfer paper immediately after opening the package may have a water content of from 3.5 to 6.0% by weight. The product is preferably packaged in a moistureproof packaging material such as polyethylene-laminated paper or polypropylene so as to prevent absorption or desorption of moisture during storage.

The present invention will now be illustrated in greater detail with reference to Examples, but it should be understood that the present invention is not limited thereto. Unless otherwise indicated, all the percents and parts are by weight. In Examples and Comparative Examples, the term "smoothness" means "Oken's smoothness".

EXAMPLE 1

Pulp prepared by beating LBKP having been highly whitened through multistage bleaching with an oxygen bleacher, etc. to a Canadian standard freeness of 470 ml was used as a raw material. The pulp were added 10% of precipitated calcium carbonate (TP121, produced by Okutama Kogyo K. K.), 0.08% of an alkenyl succinic anhydride (Fibran 81, produced by Oji National K. K.) as an internal size, and 0.5% of cationic starch (Cato 15, produced by Oji National K. K.). To the resulting stuff was added a small amount of a fluorescent dye. The stuff was made into paper having a basis weight of 70 g/m$^2$ and an index of formation of 25 on a multi-cylinder type wire paper machine and dried to a water content of 5%. Oxidized starch and NaCl were applied at a coverage of 0.9 g/m$^2$ and 0.1 g/m$^2$, respectively, in the subsequent size press step and then subjected to pressing and calendering under intensified conditions to increase the smoothness and density to obtain base paper having an apparent density of 0.80 g/cm$^3$.

In 100 parts of water were dispersed 0.5 part of sodium pyrophosphate, 80 parts (on a solid basis, hereinafter the same) of precipitated calcium carbonate having an average particle size of 2 μm (produced by Maruo Calcium Co., Ltd.), and 20 parts of kaolin clay (Ultragloss 90, produced by E. M. C.) in a Cowless dissolver to prepare a pigment slurry. The slurry was mixed with 10.5 parts of SBR (JSR 0662, produced by Japan Synthetic Rubber Co., Ltd.), 4.5 parts of PVA (Poval 117, produced by Kuraray Co., Ltd.), and 2 parts of a quaternary ammonium salt, and the mixture was stirred together with water to prepare a coating composition having a concentration of 20%.

The resulting coating composition was applied to each of the felt and the wire sides of the base paper to a coating weight of 3.6 g/m$^2$/side on a solid basis by means of a wire bar coater. The coated paper was subjected to super calendering to give a smoothness of 100 seconds to the coated felt side, and the water content of the coated paper was so adjusted that the product taken out of the package might have a water content of 4%. The characteristics of the resulting coated paper are shown in Table 1 below.

IMAGE FORMATION TEST

A 2 cm × 2 cm patch having an image area ratio stepwise increasing from 10 to 100% by 10% was printed in yellow, magenta, cyan, red, green, blue, or mixed black (color mixture of yellow, magenta, and cyan) on the coated paper and fixed by use of a digital color copying machine A Color 635, manufactured by Fuji Xerox Co., Ltd.

The patches of every color having an image area ratio of 20%, 30%, and 40% were observed with the naked eye to evaluate graininess in the middle tone. The patches of every color having an image area ratio of 50 to 100% were observed with the naked eye to evaluate fine unevenness of gloss and density and mottles in the middle tone to solid area.

Standards for evaluation are shown below.

Graininess in Middle Tone

A . . . Satisfactory

B . . . Acceptable, though having a slight feeling of roughness

C . . . Having a slight feeling of roughness

D . . . Having an appreciable feeling of roughness

Fine Unevenness of Gloss or Density in Middle Tone to Solid Area

A . . . Satisfactory

B . . . Acceptable, though slightly having fine unevenness

C . . . Slight fine unevenness observed

D . . . Fine unevenness observed appreciably

Mottles in Middle Tone to Solid Image Area

A . . . Satisfactory

B . . . Acceptable, though slightly having mottles

C . . . Sparse mottles observed

D . . . Mottles observed appreciably

As is apparent from Table 1, the transfer paper of Example 1 provides a high quality toner image particularly excellent in graininess, freedom from fine unevenness of gloss or density, and freedom from mottles.

EXAMPLES 2 AND 3

Transfer paper for electrophotography having the characteristics shown in Table 1 was prepared in the same manner as in Example 1, except that the coating composition was applied only to the felt side to form a coating layer having a solids content of 3.0 g/m$^2$ (Example 2) or 2.0 g/m$^2$ (Example 3). The transfer paper was evaluated in the same manner as in Example 1 to give the results shown in Table 1.

It is seen from Table 1 that the transfer paper of Examples 2 and 3 is somewhat inferior to that of Example 1 in graininess and freedom from fine unevenness of gloss or density and yet satisfactory for practical use.

EXAMPLE 4

Transfer paper for electrophotography having the characteristics shown in Table 1 was prepared in the same manner as in Example 1, except that the coating composition was applied only to the felt side to form a coating layer having a solids content of 4.0 g/m$^2$ and that the coated paper was dried by means of an infrared drier so as to have a water content of 6% after the package is opened. The transfer paper was evaluated in the same manner as in Example 1 to given the results shown in Table 1.

It is seen from Table 1 that the transfer paper of Example 4 is somewhat inferior to that of Example 1 in freedom from mottles and yet satisfactory for practical use.

EXAMPLE 5

Base paper was prepared using the same stuff and method as used in Example 1, except for changing the basis weight and the index of formation to 80 g/m$^2$ and 20, respectively, reducing the amount of NaCl used in the size press step to 0.02 g/m$^2$, and slightly intensifying the calendering to give an apparent density of 0.83 g/cm$^3$.

A coating composition having the same formulation as used in Example 1 except for using 100 parts of magnesium carbonate having an average particle size of 6 μm as a pigment was applied to the felt side of the base paper to a solid coating weight of 5 g/m$^2$ with a wire bar coater. Without being subjected to super calendering, the coated paper was dried in an infrared drier so as to have a water content of 4% when taken out of the package. The characteristics of the resulting transfer paper are shown in Table 1.

The transfer paper was evaluated in the same manner as in Example 1 to give the results shown in Table 1. It is seen that the transfer paper of Example 5 is satisfactory for practical use, although slightly inferior to that of Example 1 in terms of freedom from mottles.

EXAMPLE 6

Base paper was prepared using the same stuff and method as used in Example 1, except for changing the basis weight and the index of formation to 80 g/m$^2$ and 30, respectively, reducing the amount of NaCl used in the size press step to 0.02 g/m$^2$, and conducting super calendering under the same conditions as in Example 5 to give an apparent density of 0.83 g/cm$^3$.

The same coating composition as used in Example 5 was applied to the felt side of the base paper to a solid coating weight of 3.6 g/m$^2$ with a wire bar coater, and the coated paper was finished in the same manner as in Example 5 to obtain transfer paper for electrophotography having the characteristics shown in Table 1.

The transfer paper was evaluated in the same manner as in Example 1 to give the results shown in Table 1. It is seen that the transfer paper of Example 6 is superior in freedom from mottles and slightly inferior in graininess and freedom from unevenness of gloss or density to that of Example 5 yet satisfactory for practical use.

EXAMPLE 7

Base paper was prepared using the same stuff and method as used in Example 1, except for changing the basis weight and the index of formation to 85 g/m$^2$ and 28, respectively, changing the amount of NaCl to 0.08 g/m$^2$, and intensifying the calendering conditions to increase the apparent density to 0.95 g/cm$^3$.

A coating composition was prepared according to the same formulation as used in Example 1, except for using 90 parts of precipitated calcium carbonate (PC, produced by Shiraishi Kogyo K. K.) and 10 parts of kaolin clay as pigments and replacing SBR and PVA as binders with 150 parts of oxidized starch (Ace A, produced by Oji Corn Starch Co., Ltd.). The coating composition was applied to the felt side of the base paper to a solid coating weight of 3.6 g/m$^2$ with a wire bar coater. The coated paper was subjected to super calendering to give a smoothness of 150 seconds to the coated felt side and dried in an infrared drier so as to give a water content of 5.5% after opening the package. The characteristics of the resulting transfer paper are shown in Table 1.

The transfer paper was evaluated in the same manner as in Example 1 to give the results shown in Table 1. It is seen that the transfer paper of Example 7 is particularly excellent in graininess, freedom from fine unevenness of gloss and density, and freedom from mottles.

EXAMPLE 8

Transfer paper for electrophotography was prepared in the same manner as in Example 1, except that the coated paper was subject to super calendering to give a smoothness of 300 seconds to the coated felt side and dried in an infrared drier so as to have a water content of 6% after being taken out of the package. The characteristics of the resulting transfer paper are shown in Table 1.

The transfer paper was evaluated in the same manner as in Example 1 to give the results shown in Table 1. It is seen that the transfer paper of Example 8 is satisfactory for practical use, although somewhat inferior to that of Example 7 in graininess and freedom from mottles.

EXAMPLE 9

Base paper was prepared using the same stuff and method as used in Example 1, except for changing the basis weight and the index of formation to 90 g/m$^2$ and 20, respectively, and conducting calendering under the same conditions as in Example 1 to give an apparent density of 0.80 g/cm$^3$.

A coating composition having the same formulation as used in Example 1 except for using 100 parts of calcium carbonate having an average particle size of 8 μm as a pigment was applied to the felt side of the base paper to a solid coating weight of 10 g/m$^2$ with a gate roller coater. The coated paper was subjected to super calendering under very mild conditions to have a smoothness of 40 seconds in its coated felt side and dried in an infrared drier so as to have a water content of 5% after being taken out of the package. The characteristics of the resulting transfer paper are shown in Table 1.

The transfer paper was evaluated in the same manner as in Example 1 to give the results shown in Table 1. It is seen that the transfer paper of Example 9 is slightly inferior to that of Example 1 in terms of graininess, freedom from fine unevenness of gloss or density, and freedom from mottles, yet satisfactory for practical use.

EXAMPLES 10 AND 11

Transfer paper for electrophotography was prepared in the same manner as in Example 1, except that the amount of NaCl used in the preparation of base paper was changed to 0.15 g/m$^2$ (Example 10) or 0.01 g/m$^2$ (Example 11). The characteristics of the resulting transfer paper are shown in Table 1. As a result of the same evaluation as in Example 1, the transfer paper of Examples 10 and 11 was found somewhat inferior to that of Example 1 in terms of graininess, freedom from fine unevenness of gloss or density, and freedom from mottles, and yet satisfactory for practical use.

TABLE 1

| | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Base Paper: | | | | | | | | | | | |
| Basis weight (g/cm$^2$) | 70 | 70 | 70 | 70 | 80 | 80 | 85 | 70 | 90 | 70 | 70 |
| Apparent density (g/cm$^3$) | 0.80 | 0.80 | 0.80 | 0.80 | 0.83 | 0.83 | 0.95 | 0.80 | 0.80 | 0.80 | 0.80 |
| Index of formation | 25 | 25 | 25 | 25 | 20 | 30 | 28 | 25 | 20 | 25 | 25 |
| Coated Paper: | | | | | | | | | | | |
| Total basis weight (g/m$^2$) | 77.2 | 73 | 72 | 74 | 85 | 83.6 | 88.6 | 77.2 | 100 | 77.2 | 77.2 |
| Smoothness of coated felt side (sec) | 100 | 100 | 80 | 100 | 30 | 20 | 150 | 300 | 40 | 100 | 100 |
| Avg. equiv. circle diam. of void portions (μm) | 2 | 5.0 | 8 | 2 | 8 | 9 | 3 | 1.5 | 10 | 2 | 2 |
| Avg. equiv. circle diam. of void-free portions (μm) | 2 | 2 | 2 | 2 | 6 | 6 | 3 | 4 | 8 | 2 | 2 |
| Proportion of void portions greater than 20 μm (avg. | 0 | 1 | 2 | 0 | 1 | 2 | 0 | 0 | 2 | 0 | 0 |

TABLE 1-continued

| | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| equiv. circle diam.) (%) | | | | | | | | | | | |
| Felt side/wire side coating weight (g/m²) | 3.6 /3.6 | 3/0 | 2/0 | 4/0 | 5/0 | 3.6/0 | 3.6/0 | 3.6 /3.6 | 10/0 | 3.6 /3.6 | 3.6 /3.6 |
| Surface resistivity (Ω) | $5 \times 10^9$ | $5 \times 10^9$ | $5 \times 10^9$ | $4 \times 10^9$ | $1 \times 10^{11}$ | $1 \times 10^{11}$ | $1 \times 10^{10}$ | $1 \times 10^{10}$ | $5 \times 10^9$ | $1 \times 10^9$ | $5 \times 10^{11}$ |
| Water content of final product (%) | 4 | 4 | 4 | 6 | 4 | 4 | 5.5 | 6 | 5 | 4 | 4 |
| Image Quality: | | | | | | | | | | | |
| Graininess in halftone | A | B | B | A | A | B | A | B | B | B | B |
| Fine unevenness of gloss/density in halftone to solid area | A | B | B | A | A | B | A | A | B | B | B |
| Mottles in halftone to solid area | A | A | A | B | B | A | A | B | B | B | B |

COMPARATIVE EXAMPLE 1

Transfer paper for electrophotography having the characteristics shown in Table 2 below was prepared in the same manner as in Example 1, except for changing the coating weight on each of the felt side and the wire side to 1.5 g/m², and evaluated in the same manner as in Example 1. The results obtained are shown in Table 2. The transfer paper of Comparative Example 1 was extremely inferior to that of Example 1 in graininess and fine unevenness of gloss or density and was impractical.

COMPARATIVE EXAMPLE 2

Transfer paper for electrophotography having the characteristics shown in Table 2 was prepared in the same manner as in Example 4, except that the water content of the product after opening the package was set at 6.5%, and evaluated in the same manner as in Example 1. The results obtained are shown in Table 2. The transfer paper of Comparative Example 2 was slightly inferior in graininess and fine unevenness of gloss or density, particularly extremely inferior in mottles to that of Example 1 and was impractical.

COMPARATIVE EXAMPLE 3

Transfer paper for electrophotography having the characteristics shown in Table 2 was prepared in the same manner as in Example 1, except that the index of formation of the base paper was set at 19, and evaluated in the same manner as in Example 1. The results obtained are shown in Table 2. Inferiority of the transfer paper of Comparative Example 3 in graininess and freedom from fine unevenness of gloss or density was not so great, but the transfer paper was extremely inferior in mottles and impractical.

COMPARATIVE EXAMPLE 4

Transfer paper for electrophotography having the characteristics shown in Table 2 was prepared in the same manner as in Example 1, except for using base paper having an index of formation of 15 and a slightly decreased apparent density, and evaluated in the same manner as in Example 1. The results obtained are shown in Table 2. The transfer paper of Comparative Example 4 was inferior in graininess and freedom from mottles and was impractical.

COMPARATIVE EXAMPLE 5

Transfer paper for electrophotography having the characteristics shown in Table 2 was prepared in the same manner as in Example 7, except that the coating composition was applied only to the felt side of the base paper to form a coating layer having a solids content of 4 g/m², and the coated paper was subjected to intense super calendering and then dried with an infrared drier so as to have a water content of 5% after being taken out of the package. The transfer paper was evaluated in the same manner as in Example 1. The results obtained are shown in Table 2. The transfer paper of Comparative Example was impractical due to the considerably deteriorated graininess.

COMPARATIVE EXAMPLE 6

Transfer paper for electrophotography having the characteristics shown in Table 2 was prepared in the same manner as in Example 7, except for using 100 parts of magnesium carbonate having an average particle size of 9 μm as a pigment, applying the coating composition to the felt side of the base paper to a solid coating weight of 15 g/m², omitting super calendering, and drying the coated paper in an infrared drier so as to give a water content of 5% after opening the package. The smoothness of the coated felt side of the resulting transfer paper was 30 seconds.

As a result of the same evaluation as in Example 1, the transfer paper of Comparative Example 6 shows considerably deteriorated graininess and inferiority in freedom from fine unevenness of gloss or density and was impractical.

COMPARATIVE EXAMPLE 7

Transfer paper for electrophotography having the characteristics shown in Table 2 was prepared in the same manner as in Example 1, except that the amount of NaCl used in the preparation of base paper was changed to 0.20 g/m². As a result of the same evaluation as in Example 1, the transfer paper of Comparative Example 7 was found inferior in all the terms of graininess, freedom from fine unevenness of gloss or density, and freedom from mottles, and therefore impractical.

COMPARATIVE EXAMPLE 8

Transfer paper for electrophotography having the characteristics shown in Table 2 was prepared in the same manner as in Example 1, except that application of NaCl to the base paper was omitted. As a result of the same evaluation as in Example 1, the transfer paper of Comparative Example 8 was found inferior in terms of graininess, freedom from fine unevenness of gloss or density, and freedom from mottles, and therefore impractical.

TABLE 2

| | Comparative Example No. | | | | | | | |
|---|---|---|---|---|---|---|---|---|
| | 1 | 2 | 3 | 4 | 5 | 6 | 7 | 8 |
| Base Paper: | | | | | | | | |
| Basis weight (g/cm$^2$) | 70 | 70 | 70 | 70 | 85 | 85 | 70 | 70 |
| Apparent density (g/cm$^3$) | 0.80 | 0.80 | 0.80 | 0.78 | 0.95 | 0.95 | 0.80 | 0.80 |
| Index of formation | 25 | 25 | 19 | 15 | 28 | 28 | 25 | 25 |
| Coated Paper: | | | | | | | | |
| Total basis weight (g/m$^2$) | 73 | 74 | 77.2 | 77.2 | 89 | 100 | 77.2 | 77.2 |
| Smoothness of coated felt side (sec) | 100 | 100 | 100 | 100 | 400 | 30 | 100 | 100 |
| Avg. equiv. circle diam. of void areas (μm) | 11 | 1.5 | 2 | 2 | 1 | 12 | 2 | 2 |
| Avg. equiv. circle diam. of void-free areas (μm) | 2 | 2 | 2 | 2 | 3 | 9 | 2 | 2 |
| Proportion of void areas greater than 20 μm (avg. equiv. circle diam.) (%) | 6 | 0 | 0 | 0 | 0 | 10 | 0 | 0 |
| Felt side/wire side coating weight (g/m$^2$) | 1.5/1.5 | 4/0 | 3.6 /3.6 | 3.6 /3.6 | 4/0 | 15/0 | 3.6 /3.6 | 3.6 /3.6 |
| Surface resistivity (Ω) | 5 × 10$^9$ | 4 × 10$^9$ | 5 × 10$^9$ | 5 × 10$^9$ | 1 × 10$^{10}$ | 1 × 10$^{10}$ | 8 × 10$^8$ | 6 × 10$^{11}$ |
| Water content of final product (%) | 4 | 6.5 | 4 | 4 | 5 | 5 | 4 | 4 |
| Image Quality: | | | | | | | | |
| Graininess in middle tone | D | C | B | C | D | D | C | C |
| Fine unevenness of gloss/density in middle to solid area | D | C | B | A | A | C | C | D |
| Mottles in halftone to solid area | A | D | C | D | A | A | D | C |

EXAMPLE 12

Commercially available neutral paper having a basis weight of 81.4 g/m$^2$ and an apparent density of 0.83 g/cm$^3$ was coated with 0.1 g/m$^2$ of NaCl to prepare base paper.

In 100 parts of water was dissolved 0.05 part of sodium polyphosphate, and 80 parts of cubic precipitated calcium carbonate particles having an average particle size of 3.0 μm and 20 parts of kaolin were dispersed therein to prepare a pigment dispersion. The dispersion was mixed successively with 15 parts of SBR and 5 parts of PVA to prepare a coating composition.

The resulting coating composition was applied to each of the felt and wire sides of the base paper to form a coating layer having a solids content of 4.5 g/m$^2$/side by means of a bar coater. The coated paper was subjected to calendering to give a smoothness of 70 seconds to the coated side. The characteristics of the resulting coated paper are shown in Table 3 below.

IMAGE FORMATION TEST

A mixture of a polyester resin and a yellow, magenta or cyan pigment was kneaded in an extruder, ground in a jet mill, and classified by an air classifier to prepare a yellow, magenta or cyan toner having a volume average diameter ($d_{50}$) of 7 μm. The toner was mixed with a charge control agent to prepare a toner composition. Five parts of the toner composition were mixed with 100 parts of a carrier having a particle size of 50 μm and comprising ferrite particles coated with a methyl methacrylate/styrene copolymer in a tumbler shaker mixer to prepare a developer.

A 2 cm × 2 cm patch having an image area ratio stepwise increasing from 10 to 100% by 10% was copied on the coated paper using each of yellow, magenta, cyan, red, green, blue, or mixed black developers (color mixture of yellow, magenta, and cyan) by means of a digital color copying machine A Color 635, manufactured of Fuji Xerox Co., Ltd.

The patches of every color having an image area ratio of 20%, 30%, and 40% were observed with the naked eye to evaluate graininess in the halftone. The patches of every color having an image area ratio of 90 to 100% were observed with the naked eye to evaluate unevenness of gloss and density in high image density area.

Standards for evaluation are shown below.

Graininess in Halftone

A . . . Satisfactory

B . . . Acceptable, though having a slight feeling of roughness

C . . . Having a slight feeling of roughness

D . . . Having an appreciable feeling of roughness

Fine Unevenness of Gloss in High Image Density Area

A . . . Satisfactory

B . . . Acceptable, though slightly having fine unevenness of gloss

C . . . Slight fine unevenness of gloss observed

D . . . Fine unevenness of gloss observed appreciably

Unevenness of Density in High Image Density Area

A . . . Satisfactory

B . . . Acceptable, though slightly having unevenness of density

C . . . Slight unevenness of density observed

D . . . Unevenness of density observed appreciably

Standard for Overall Quality o . . . Satisfactory

Δ . . . Slightly problematical yet acceptable x . . . Unacceptable

As is apparent from Table 3, the transfer paper of Example 12 was particularly excellent in graininess and free from fine unevenness of gloss and density.

EXAMPLES 13 TO 16

Transfer paper was prepared in the same manner as in Example 12, except for changing the solids content of each coating layer to 2.0 g/m$^2$, 3.6 g/m$^2$ or 10.0 g/m$^2$ (Example 13, 14 or 15, respectively).

Transfer paper was prepared in the same manner as in Example 12, except that the coating composition was applied to only one side of the base paper to a solids content of 6.0 g/m$^2$ (Example 16).

Each of the samples prepared was evaluated in the same manner as in Example 12. The results obtained are shown in Table 3. It is seen that the sample of Example 13 is excellent in freedom from gloss unevenness in the high image density area and those of Examples 14 and 16 are excellent in graininess in the halftone as well as freedom from unevenness of gloss and density in the high image density area. In Example 15, transfer paper excellent in graininess in the halftone and free from unevenness of gloss in the high image density area was obtained.

EXAMPLES 17 TO 19

Transfer paper was prepared in the same manner as in Example 12, except that the cubic calcium carbonate having an average particle size of 3.0 μm as used in Example 12 was replaced with 80 parts of amorphous silica having an average particle size of 5.0 μm (Example 17), 80 parts of spherical magnesium carbonate having an average particle size of 6.0 μm (Example 18) or 80 parts of spherical precipitated calcium carbonate having an average particle size of 1.5 μm (Example 19) and that calendering was conducted to give a smoothness of 50 seconds (Examples 17 and 18) or 100 seconds (Example 19). The characteristics of the resulting transfer paper are shown in Table 3.

Each of the paper samples prepared in Examples 17 to 19 was evaluated in the same manner as in Example 12, except that the volume average particle size of the toner used in the developer was changed to 5 μm for use in Example 17, 9 μm for Example 18, and 11 μm for Example 19. The particle size of the toner was adjusted by controlling the pressure for grinding in the jet mill, the rate of feeding to the jet mill, and the number of revolution of the air classifier. The results of the evaluation are shown in Table 3.

It can be seen from Table 3 that transfer paper excellent in graininess in the halftone and freedom from unevenness of gloss or density in the high image density area was obtained in Example 17, the transfer paper of Example 18 exhibits freedom from unevenness of gloss or density in the high image density area, and that of Example 19 was free from unevenness of density in the high image density area and satisfactory for practical use.

EXAMPLES 20 AND 21

Transfer paper having the characteristics shown in Table 3 was prepared in the same manner as in Example 12, except that the amount of NaCl used in the preparation of base paper was changed to 0.2 g/m$^2$ (Example 20) or 0.03 g/m$^2$ (Example 21).

The resulting transfer paper was evaluated in the same manner as in Example 12 but using the toner having a volume average particle size of 9 μm. As a result, the transfer paper exhibited freedom from unevenness of gloss or density in the high image density area in each case.

EXAMPLES 22 AND 23

Transfer paper having the characteristics shown in Table 3 was prepared in the same manner as in Example 12, except that the basis weight of the base paper was changed to 64.0 g/m$^2$ (Example 22) or 100 g/m$^2$ (Example 23) and the smoothness of the coated paper was adjusted to 90 seconds.

The resulting transfer paper was evaluated in the same manner as in Example 12. As shown in Table 3, the transfer paper of Example 22 exhibited excellent graininess in the middle tone, and that of Example 23 was excellent in freedom from unevenness of gloss in the high image density area and satisfactory for practical use.

TABLE 3

| | Example No. | | | | | | | | | | | |
|---|---|---|---|---|---|---|---|---|---|---|---|---|
| | 12 | 13 | 14 | 15 | 16 | 17 | 18 | 19 | 20 | 21 | 22 | 23 |
| Basis weight of base paper (g/m$^2$) | 81.4 | 81.4 | 81.4 | 81.4 | 81.4 | 81.4 | 81.4 | 81.4 | 81.4 | 81.4 | 64.0 | 100 |
| Coating weight on each side (g/m$^2$) | 4.5 /4.5 | 2.0 /2.0 | 3.6 /3.6 | 10.0 /10.0 | 6.0 /6.0 | 4.5 /4.5 | 4.5 /4.5 | 4.5 /4.5 | 4.5 /4.5 | 4.5 /4.5 | 4.5 /4.5 | 4.5 /4.5 |
| Total basis weight (g/m$^2$) | 90.4 | 85.4 | 88.6 | 101.4 | 87.4 | 90.4 | 90.4 | 90.4 | 90.4 | 90.4 | 73.0 | 109 |
| Volume avg. particle size of toner (Td) (μm) | 7 | 7 | 7 | 7 | 7 | 5 | 9 | 11 | 9 | 9 | 7 | 7 |
| Avg. equiv. circle diam. of void portions ($Pd_1$) (μm) ($Pd_1/Td$) | 5.9 (0.84) | 7.0 (1.00) | 6.6 (0.94) | 2.8 (0.40) | 4.4 (0.63) | 7.0 (1.40) | 9.1 (1.01) | 2.3 (0.21) | 5.5 (0.61) | 5.1 (0.56) | 5.0 (0.71) | 6.8 (0.97) |
| Avg. equiv. circle diam. of void-free portions ($Pd_2$) (μm) ($Pd_2/Td$) | 6.8 (0.97) | 9.5 (1.36) | 8.1 (1.16) | 4.1 (0.59) | 5.1 (0.73) | 7.2 (1.44) | 9.6 (1.07) | 2.4 (0.22) | 6.6 (0.73) | 6.4 (0.71) | 6.3 (0.90) | 6.5 (0.93) |
| Proportion of void portions greater than 20 μm (avg. equiv. circle diam.) (%) | 1 | 1 | 1 | 0 | 0 | 1 | 2 | 0 | 0 | 0 | 1 | 1 |
| Surface resistivity | 1.0 × | 1.0 × | 1.0 × | 5.0 × | 1.0 × | 1.0 × | 1.0 × | 1.0 × | 1.0 × | 4.0 × | 1.0 × | 1.0 × |

TABLE 3-continued

| | Example No. | | | | | | | | | | | |
|---|---|---|---|---|---|---|---|---|---|---|---|---|
| | 12 | 13 | 14 | 15 | 16 | 17 | 18 | 19 | 20 | 21 | 22 | 23 |
| (Ω) | $10^{10}$ | $10^{10}$ | $10^{10}$ | $10^{10}$ | $10^{10}$ | $10^{10}$ | $10^{10}$ | $10^{10}$ | $10^{9}$ | $10^{10}$ | $10^{10}$ | $10^{10}$ |
| Smoothness of coated side (sec) | 70 | 70 | 70 | 70 | 70 | 50 | 50 | 100 | 70 | 70 | 90 | 90 |
| Graininess in halftone | A | B | A | A | A | A | B | B | B | B | A | B |
| Unevenness of density in high image density area | A | B | A | B | A | A | A | B | A | A | B | B |
| Unevenness of gloss in high image density area | A | A | A | A | A | A | A | A | A | A | B | A |
| Overall quality | ○ | Δ | ○ | ○ | ○ | ○ | ○ | Δ | ○ | ○ | Δ | Δ |

COMPARATIVE EXAMPLES 9 AND 10

In order to confirm the influences of coating weight on image quality, transfer paper having the characteristics shown in Table 4 below was prepared in the same manner as in Example 12, except for changing the coating weight to form a coating layer having a solids content of 1.0 g/m$^2$ (Comparative Example 9) or 14.0 g/m$^2$ (Comparative Example 19) per side.

The resulting transfer paper was evaluated in the same manner as in Example 12. The results obtained are shown in Table 4. In Comparative Example 9, since the surface of the base layer was not sufficiently covered with the coating composition, the coating layer contained coarse voids and void-free areas distributed non-uniformly. The toner image formed thereon showed roughness in the halftone and was impractical. In Comparative Example 10, the transfer paper exhibited insufficient heat conduction at fixing due to the large thickness of the coating layer, the size of void areas and void-free areas of the coating layer tended to be non-uniform, and the transferred image suffered from unevenness in gloss and density in the high image density area.

COMPARATIVE EXAMPLES 11 TO 13

In order to confirm the influences of the size of void areas and void-free areas upon image quality, transfer paper having the characteristics shown in Table 4 was prepared in the same manner as in Example 12, except for using 80 parts of spherical magnesium carbonate having an average particle size of 12 μm as a pigment so as to increase the average diameter of void areas and void-free areas (the smoothness of the coating layer was 70 seconds) (Comparative Example 11); or using 80 parts of spherical precipitated calcium carbonate having an average particle size of 1.0 μm as a pigment so as to decrease the average diameter of void areas and void-free areas and adjusting the smoothness of the coating layer to 500 seconds (Comparative Example 12); or using 50 parts of cubic precipitated calcium carbonate having an average particle size of 1.0 μm and 50 parts of kaolin as pigments so as to make the average diameter of void areas smaller than that of void-free areas (the smoothness of the coating layer was 70 seconds) (Comparative Example 13).

Each of the paper samples prepared in Comparative Examples 11 to 13 was evaluated in the same manner as in Example 12, except that the volume average particle size of the toner used in the developer was changed to 7 μm for use in Comparative Example 11, 5 μm for Comparative Example 12, and 9 μm for Comparative Example 13. The particle size of the toner was adjusted by controlling the pressure for grinding in the jet mill, the rate of feeding to the jet mill, and the number of revolution of the air classifier. The results of the evaluation are shown in Table 4.

In Comparative Example 11, since the average circle-equivalent diameter of void areas and that of void-free areas are each too large with respect to the toner particle size, a molten toner penetrates non-uniformly to cause unevenness of density and gloss in the high image density area. Therefore, the transfer paper of Comparative Example 11 was impractical. In Comparative Examples 12 and 13, on the other hand, the average equivalent circle diameter of void areas and that of void-free areas are each too small with respect to the toner particle size, a molten toner hardly penetrates into the coating layer to cause disturbance of a line image, particularly roughness in the middle tone.

COMPARATIVE EXAMPLE 14

The same neutral paper as used in Example 12 was coated on each side thereof with 0.1 g/m$^2$ (on a solid basis) of NaCl (total coating weight on both sides: 0.2 g/m$^2$) and then subjected to calendering to a smoothness of 70 seconds to prepare transfer paper having many coarse voids having a equivalent circle diameter of 20 μm or greater as observed from the surface thereof. The characteristics of the resulting non-coated transfer paper are shown in Table 4.

In order to confirm the adverse influences of the coarse voids of 20 μm or grater on the surface layer of non-coated paper upon image quality, the transfer paper was evaluated in the same manner as in Example 12 using a developer comprising toner particles having a volume average particle size of 11 μm. The results obtained are shown in Table 4. As a result, the transferred image had roughness in the halftone and unevenness in gloss and density in the high image density area so that the transfer paper did not withstand practical use.

COMPARATIVE EXAMPLES 15 AND 16

Transfer paper having a reduced surface resistivity was prepared in the same manner as in Example 12 except that the coating weight of NaCl on the base paper was changed to 0.4 g/m$^2$ (the smoothness of the coated layer was 70 seconds). The surface resistivity of the resulting transfer paper was as low as $2.0\times10^{8}$ Ω.

Transfer paper having an increased surface resistivity was prepared in the same manner as in Example 12 except that NaCl was not applied on the base paper (the smoothness of the coated layer was 70 seconds). The surface resistivity of the resulting transfer paper was as high as $9\times10^{11}$ Ω.

The characteristics of the transfer paper prepared in Comparative Examples 15 and 16 are shown in Table 4. In order to confirm the influences of surface resistivity on image quality, the transfer paper of Comparative Examples 15 and 16 was evaluated in the same manner as in Example 12 to give the results shown in Table 4.

melted due to too high the basis weight, resulting in unevenness of gloss particularly in the high image density area. Thus, the transfer paper did not withstand practical use.

TABLE 4

| | Comparative Example No. | | | | | | | | | |
|---|---|---|---|---|---|---|---|---|---|---|
| | 9 | 10 | 11 | 12 | 13 | 14 | 15 | 16 | 17 | 18 |
| Basis weight of base paper (g/m$^2$) | 81.4 | 81.4 | 81.4 | 81.4 | 81.4 | 81.4 | 81.4 | 81.4 | 52.3 | 127.9 |
| Coating weight on each side (g/m$^2$) | 1.0 /1.0 | 14 /14 | 4.5 /4.5 | 4.5 /4.5 | 4.5 /4.5 | 0.1 /0.1 | 4.5 /4.5 | 4.5 /4.5 | 4.5 /4.5 | 4.5 /4.5 |
| Total basis weight (g/m$^2$) | 83.4 | 109.4 | 90.4 | 90.4 | 90.4 | 81.6 | 90.4 | 90.4 | 61.3 | 134.9 |
| Volume average particle size of toner (Td) (μm) | 7 | 7 | 7 | 5 | 9 | 11 | 9 | 9 | 7 | 7 |
| Avg. equiv. circle diam. of void areas ($Pd_1$) (μm) ($Pd_1$/Td) | 9.1 (1.30) | 7.2 (1.03) | 10.9 (1.56) | 1.0 (0.20) | 1.4 (0.16) | 18.0 (1.64) | 5.6 (0.62) | 6.0 (0.67) | 5.2 (0.74) | 7.2 (1.03) |
| Avg. equiv. circle diam. of void-free areas ($Pd_2$) (μm) ($Pd_2$/Td) | 15.1 (2.16) | 13.0 (1.86) | 12.0 (1.71) | 1.0 (0.20) | 5.0 (0.56) | 30.0 (2.73) | 6.4 (0.71) | 6.8 (0.76) | 7.8 (1.11) | 6.1 (0.87) |
| Proportion of void areas greater than 20 μm (avg. equiv. circle diam.) (%) | 10 | 5 | 2 | 0 | 0 | 20 | 0 | 0 | 1 | 0 |
| Surface resistivity (Ω) | $6.0 \times 10^9$ | $1.0 \times 10^{11}$ | $1.0 \times 10^{10}$ | $1.0 \times 10^{10}$ | $1.0 \times 10^{10}$ | $5.0 \times 10^9$ | $2.0 \times 10^8$ | $9.0 \times 10^{11}$ | $1.0 \times 10^{10}$ | $1.0 \times 10^{10}$ |
| Smoothness of coated side (sec) | 70 | 70 | 70 | 500 | 70 | 70 | 70 | 70 | 100 | 50 |
| Graininess in halftone | D | D | D | D | D | D | D | D | C | C |
| Unevenness of density in high image density area | C | B | D | B | C | D | C | C | D | C |
| Unevenness of gloss in high image density area | C | D | D | B | D | D | C | C | C | D |
| Overall quality | x | x | x | x | x | x | x | x | x | x |

As a result, in both Comparative Examples 15 and 16, the transferred image suffered from noticeable roughness particularly in the halftone and noticeable image missing and unevenness of density in the middle to high image density area, and the transfer paper was impractical.

COMPARATIVE EXAMPLES 17 AND 18

Transfer paper of Comparative Example 17 was prepared in the same manner as in Example 12, except for using commercially available neutral paper having a basis weight of 52.3 g/m$^2$ and adjusting the smoothness of the coated layer at 100 seconds by calendering. The total basis weight of the coated paper was as low as 61.3 g/m$^2$.

Transfer paper of Comparative Example 18 was prepared in the same manner as in Example 12, except for using commercially available neutral paper having a basis weight of 127.9 g/m$^2$ and adjusting the smoothness of the coated layer at 50 seconds by calendering. The total basis weight of the coated paper was as high as 136.9 g/m$^2$. The characteristics of the transfer paper of Comparative Examples 18 and 19 are shown in Table 4.

In order to confirm the influences of basis weight on image quality, each transfer paper was evaluated in the same manner as in Example 12 to give the results shown in Table 4.

In Comparative Example 17, the toner was melted excessively at the time of fixing due to too low the basis weight, causing considerable unevenness of density particularly in the high image density area. In Comparative Example 18, the toner on the image density area was not sufficiently

EXAMPLE 24

Commercially available neutral paper having a basis weight of 82.0 g/m$^2$ and an apparent density of 0.83 g/cm$^3$ was coated with 0.1 g/m$^2$ of NaCl to prepare base paper.

In 100 parts of water was dissolved 0.05 part of sodium polyphosphate, and 80 parts of precipitated calcium carbonate having an average particle size of 1.5 μm and 20 parts of kaolin were dispersed therein to prepare a pigment dispersion. The dispersion was mixed successively with 15 parts of SBR and 5 parts of PVA to prepare a coating composition.

The resulting coating composition was applied to one side of the base paper to form a coating layer having a solids content of 4 g/m$^2$ by means of a bar coater. The coated paper was subjected to calendering to obtain transfer paper having the characteristics shown in Table 5 below.

The coated side of the transfer paper was observed under an FE-SEM, and the average particle size of the pigment and voids was obtained through image processing with an image analyzer. A tubular pigment has a tubular crystal form or a structure built up by tabular crystals, and its content is a weight percentage of whole of painting pigment at a time of the beginning of the producing process. Part of the coating layer was scraped off. The scraped coating material itself or the ash content thereof was observed under an electron microscope and also subjected to elemental analysis to obtain the weight percentage of tabular pigment particles (particles having a sheet structure or a structure built up by tabular crystals) based on the total pigment particles.

IMAGE FORMATION TEST

A 2 cm × 2 cm patch having an image area ratio stepwise increasing from 10 to 100% by 10% was copied on the transfer paper using each of yellow, magenta, cyan, red, green, blue, or mixed black developers (color mixture of yellow, magenta, and cyan) by means of a digital color copying machine A Color 635, manufactured by Fuji Xerox Co., Ltd.

The images of every color having an image area ratio of 20%, 30%, and 40% were observed with the naked eye to evaluate graininess in the middle tone. The images of every color having an image area ratio of from 50 to 100% were observed with the naked eye to evaluate unevenness of gloss and density in the middle to high image density area. The results of evaluation are shown in Table 5. Standards for evaluation are the same as those used in Example 12.

It is seen from Table 5 that the transfer paper of Example 24 is excellent in freedom from fine unevenness of gloss and density, while slightly showing rough graininess.

EXAMPLE 25

Transfer paper having the characteristics shown in Table 5 was prepared in the same manner as in Example 24 except for using precipitated calcium carbonate having an average particle size of 2 μm as a pigment and applying the coating composition to both sides of the base paper to give a solids content of 4.0 g/m$^2$ per side. The average particle size of the pigment was 2.0 μm, and the average diameter of voids was 1.5 μm.

When the resulting transfer paper was evaluated in the same manner as in Example 24, satisfactory results were obtained in graininess in the halftone and freedom from unevenness of gloss and density in the high image density area as shown in Table 5.

EXAMPLE 26

Transfer paper having the characteristics shown in Table 5 was prepared in the same manner as in Example 24 except for using precipitated calcium carbonate having an average particle size of 3 μm as a pigment. The average particle size of the pigment was 3.0 μm , and the average diameter of voids was 2.5 μm.

When the resulting transfer paper was evaluated in the same manner as in Example 24, satisfactory results were obtained in graininess in the halftone and freedom from unevenness of gloss and density in the high image density area as shown in Table 5.

EXAMPLE 27

Commercially available neutral paper having a basis weight of 64.0 g/m$^2$ and an apparent density of 0.78 g/cm$^3$ was coated with 0.1 g/m$^2$ of NaCl to prepare base paper.

In 100 parts of water was dissolved 0.05 part of sodium polyphosphate, and 95 parts of silica having an average particle size of 7 μm and 5 parts of kaolin were dispersed therein to prepare a pigment dispersion. The dispersion was mixed with 15 parts of SBR and 5 parts of PVA to prepare a coating composition.

The resulting coating composition was applied to both sides of the base paper to a solids content of 5 g/m$^2$ per side by means of a bar coater. The coated paper was subjected to calendering to obtain transfer paper having the characteristics shown in Table 5.

The transfer paper was evaluated in the same manner as in Example 24. As shown in Table 5, the transfer paper was satisfactory in graininess in the halftone and freedom from unevenness of gloss and density in the high image density area.

EXAMPLES 28 TO 30

A coating composition was prepared in the same manner as in Example 27, except for replacing silica having a particle size of 7 μm with silica having a particle size of 8 μm (Examples 28 and 29) or 10 μm (Example 30) or using no kaolin (Example 29). The coating composition was applied to the same base paper as used in Example 27 on both sides thereof (Examples 28 and 30) or one side thereof (Example 29) to form a coating layer having a solids content of 5.0 g/m$^2$ per side (Example 28), 7.0 g/m$^2$ (Example 29), or 8.0 g/m$^2$ per side (Example 30), and then subjected to calendering to obtain transfer paper having the characteristics shown in Table 5.

As a result of the same evaluation as in Example 24, each transfer paper of Examples 28 and 29 was satisfactory in both graininess in the halftone and freedom from unevenness of gloss or density in the high image density area. The transfer paper of Example 30 was somewhat inferior in graininess in the halftone and freedom from unevenness of gloss and density in the high image density area but yet provided excellent image quality.

EXAMPLE 31

Commercially available neutral paper having a basis weight of 82.0 g/m$^2$ and an apparent density of 0.75 g/cm$^3$ was coated with 0.1 g/m$^2$ of NaCl to prepare base paper.

In 100 parts of water was dissolved 0.05 part of sodium polyphosphate, and 90 parts of spherical alumina having an average particle size of 3 μm and 10 parts of kaolin were dispersed therein to prepare a pigment dispersion. The dispersion was mixed with 15 parts of SBR and 5 parts of PVA to prepare a coating composition.

The resulting coating composition was applied to one side of the base paper to a solids content of 4 g/m$^2$ by means of a bar coater, followed by calendering to obtain transfer paper having the characteristics shown in Table 5.

As a result of the same evaluation as in Example 24, the transfer paper was satisfactory in both graininess in the halftone and freedom from unevenness of gloss and density in the high image density area.

EXAMPLES 32 TO 35

The same coating composition as used in Example 26 was applied to one side of the same base paper as used in Example 26 to form a coating layer having a solids content of 2.0 g/m$^2$ (Example 32), 3.0 g/m$^2$ (Example 33), 3.6 g/m$^2$ (Example 34) or 8.0 g/m$^2$ (Example 35), and the coated paper was subjected to calendering to obtain transfer paper having the characteristics shown in Table 5.

As a result of the same evaluation as in Example 24, each transfer paper of Examples 32 and 33 provided excellent image quality, though somewhat inferior in graininess in the halftone and freedom from unevenness of gloss and density in the high image density area. Each transfer paper of Examples 34 and 35 was satisfactory in both graininess in the middle tone and freedom from unevenness of gloss and density in the high image density area.

EXAMPLES 36 to 38

Transfer paper having the characteristics shown in Table 5 was prepared in the same manner as in Example 26, except for altering the calcium carbonate/kaolin weight ratio to 40/60 (Example 36) or 30/70 (Example 37).

Transfer paper having the characteristics shown in Table 5 was prepared in the same manner as in Example 27, except for altering the silica/kaolin weight ratio to 30/70 (Example 38).

As a result of the same evaluation as in Example 24, the transfer paper of Example 36 was satisfactory in both graininess in the middle tone and freedom from unevenness of gloss or density in the high image density area. Each transfer paper of Examples 37 and 38 was slightly inferior in graininess in the halftone and freedom from unevenness of density in the high image density area but yet provided excellent image quality withstanding practical use.

EXAMPLES 39 TO 42

Transfer paper having the characteristics shown in Table 5 was prepared in the same manner as in Example 25, except for changing the coating weight of NaCl to 0.2 g/m$^2$ (Example 39), 0.18 g/m$^2$ (Example 40), 0.04 g/m$^2$ (Example 41) or 0.02 g/m$^2$ (Example 42).

As a result of the same evaluation as in Example 24, each transfer paper of Examples 39 and 42 provided sufficient image quality for practical use, though somewhat inferior in graininess in the halftone and freedom from unevenness of gloss and density in the high image density area. Each transfer paper of Examples 40 and 41 was satisfactory in graininess in the halftone and freedom from unevenness of density in the high image density area.

TABLE 5

| | Example No. | | | | | | | | | |
|---|---|---|---|---|---|---|---|---|---|---|
| | 24 | 25 | 26 | 27 | 28 | 29 | 30 | 31 | 32 | 33 |
| Basis weight of base paper (g/m$^2$) | 82 | 82 | 82 | 64 | 64 | 64 | 64 | 82 | 82 | 82 |
| Coating weight on each side (g/m$^2$) | 4.0/0 | 4.0 /4.0 | 4.0/0 | 5.0 /5.0 | 5.0 /5.0 | 7.0/0 | 8.0 /8.0 | 4.0/0 | 2.0/0 | 3.0/0 |
| Total basis weight (g/m$^2$) | 86 | 90 | 86 | 74 | 74 | 71 | 80 | 86 | 84 | 85 |
| Average particle size of toner (Td) (μm) | 1.5 | 2.0 | 3.0 | 6.0 | 8.0 | 8.0 | 10.0 | 3.0 | 3.0 | 3.00 |
| Average diameter of void portions (Pd) (μm) | 1.0 | 1.5 | 2.5 | 5.0 | 7.0 | 7.0 | 10.0 | 5.0 | 7.0 | 5.5 |
| Td - Pd (μm) | 0.5 | 0.5 | 0.5 | 1.0 | 1.0 | 1.0 | 0 | −2.0 | −4.0 | −2.5 |
| 75° Specular gloss (%) | 15 | 12 | 10 | 8 | 4 | 4 | 3 | 8 | 6 | 6 |
| Tabular pigment content (wt %) | 20 | 20 | 20 | 5 | 5 | 0 | 5 | 10 | 20 | 20 |
| Surface resistivity (Ω) | $1.0 \times 10^{10}$ | $1.0 \times 10^{10}$ | $1.0 \times 10^{10}$ | $1.0 \times 10^{10}$ | $1.0 \times 10^{10}$ | $1.0 \times 10^{10}$ | $1.0 \times 10^{10}$ | $1.0 \times 10^{10}$ | $1.0 \times 10^{10}$ | $1.0 \times 10^{10}$ |
| Graininess in halftone | B | A | A | A | A | A | B | A | B | B |
| Unevenness of density in high image density area | A | A | A | A | A | A | B | A | B | B |
| Unevenness of gloss in high image density area | A | A | A | A | A | A | B | A | B | B |
| Overall quality | Δ | ○ | ○ | ○ | ○ | ○ | Δ | ○ | Δ | Δ |

| | Example No. | | | | | | | | |
|---|---|---|---|---|---|---|---|---|---|
| | 34 | 35 | 36 | 37 | 38 | 39 | 40 | 41 | 42 |
| Basis weight of base paper (g/m$^2$) | 82 | 82 | 82 | 82 | 64 | 82 | 82 | 82 | 82 |
| Coating weight on each side (g/m$^2$) | 3.6/0 | 8.0/0 | 4.0/0 | 4.0/0 | 5.0/5.0 | 4.0/4.0 | 4.0/4.0 | 4.0/4.0 | 4.0/4.0 |
| Total basis weight (g/m$^2$) | 85.6 | 90 | 86 | 86 | 74 | 90 | 90 | 90 | 90 |
| Average particle size of toner (Td) (μm) | 3.0 | 3.0 | 3.0 | 3.0 | 6.0 | 2.0 | 2.0 | 2.0 | 2.0 |
| Average diameter of void portions (Pd) (μm) | 3.5 | 3.5 | 1.5 | 1.0 | 2.5 | 1.5 | 1.5 | 1.5 | 1.5 |
| Td - Pd (μm) | −0.5 | −0.5 | 1.5 | 2.0 | 3.5 | 0.5 | 0.5 | 0.5 | 0.5 |
| 75° Specular gloss (%) | 7 | 7 | 11 | 15 | 5 | 12 | 12 | 12 | 12 |
| Tabular pigment content (wt %) | 20 | 20 | 60 | 70 | 70 | 20 | 20 | 20 | 20 |
| Surface resistivity (Ω) | $1.0 \times 10^{10}$ | $1.0 \times 10^{10}$ | $1.0 \times 10^{10}$ | $1.0 \times 10^{10}$ | $1.0 \times 10^{10}$ | $1.0 \times 10^{9}$ | $2.0 \times 10^{9}$ | $1.0 \times 10^{11}$ | $5.0 \times 10^{11}$ |
| Graininess in halftone | A | A | A | B | B | B | A | A | B |
| Unevenness of density in high image density area | A | A | A | B | B | B | A | A | B |
| Unevenness of gloss in high image density area | A | A | A | A | A | B | A | A | A |
| Overall quality | ○ | ○ | ○ | Δ | Δ | Δ | ○ | ○ | Δ |

COMPARATIVE EXAMPLES 19 AND 20

Transfer paper of Comparative Example 19 was prepared in the same manner as in Example 24, except for increasing the amount of SBR to 40 parts and intensifying the smoothing treatment using a super calender.

Transfer paper of Comparative Example 20 was prepared in the same manner as in Example 24, except for intensifying the conditions of calendering.

to 0.3 $g/m^2$ in Comparative Example 24 or omitting the application of NaCl in Comparative Example 25.

As a result of the same evaluation as in Example 24, the image formed on each transfer paper was inferior in graininess in the halftone and freedom from unevenness of gloss and density in the high image density area.

TABLE 6

| | Comparative Example No. | | | | | | |
|---|---|---|---|---|---|---|---|
| | 19 | 20 | 21 | 22 | 23 | 24 | 25 |
| Basis weight of base paper ($g/m^2$) | 82 | 82 | 64 | 82 | 82 | 82 | 82 |
| Coating weight on each side ($g/m^2$) | 4.0/0 | 4.0/0 | 8.0/8.0 | 1.5/0 | 4.0/0 | 4.0/4.0 | 4.0/4.0 |
| Total basis weight ($g/m^2$) | 86 | 86 | 80 | 83.5 | 86 | 90 | 90 |
| Average particle size of toner (Td) (μm) | 1.5 | 1.5 | 11.0 | 3.0 | 3.0 | 2.0 | 2.0 |
| Average diameter of void areas (Pd) (μm) | <1 (0.2) | <1 (0.5) | 10.0 | 11.0 | 0.6 | 1.5 | 1.5 |
| Td - Pd (μm) | 1.3 | 1.0 | 1.0 | −8.0 | 2.4 | 0.5 | 0.5 |
| 75° Specular gloss (%) | 50 | 30 | 2 | 5 | 16 | 12 | 12 |
| Tabular pigment content (wt %) | 20 | 20 | 5 | 20 | 80 | 20 | 20 |
| Surface resistivity (Ω) | $1.0 \times 10^{10}$ | $1.0 \times 10^{10}$ | $1.0 \times 10^{10}$ | $1.0 \times 10^{10}$ | $1.0 \times 10^{10}$ | $5.0 \times 10^{8}$ | $7.0 \times 10^{11}$ |
| Graininess in halftone | C | C | D | D | C | C | C |
| Unevenness of density in high image density area | B | B | C | C | B | C | D |
| Unevenness of gloss in high image density area | A | A | C | C | A | C | C |
| Overall quality | x | x | x | x | x | x | x |

Each transfer paper was evaluated in the same manner as in Example 24. The results obtained are shown in Table 6. The formed image was inferior in graininess in the halftone in each case.

COMPARATIVE EXAMPLE 21

Transfer paper was prepared in the same manner as in Example 30, except for using silica having an average particle size of 11 μm.

As a result of the same evaluation as in Example 24, the formed image was inferior in graininess in the halftone and freedom from unevenness of gloss and density in the high image density area.

COMPARATIVE EXAMPLES 22 AND 23

Transfer paper was prepared in the same manner as in Example 26, except that the coating composition was applied to one side of the base paper to form a coating layer having a solids content of 1.5 $g/m^2$ (Comparative Example 22) or except that the calcium carbonate/kaolin weight ratio was changed to 20/80 (Comparative Example 23).

As a result of the same evaluation as in Example 24, the image formed on the transfer paper of Comparative Example 22 was inferior in graininess in the halftone and unevenness of gloss and density in the high image density area. The image on the transfer paper of Comparative Example 23 was inferior particularly in graininess in the middle tone.

COMPARATIVE EXAMPLES 24 AND 25

Transfer paper was prepared in the same manner as in Example 25, except for changing the coating weight of NaCl While the invention has been described in detail and with reference to specific examples thereof, it will be apparent to one skilled in the art that various changes and modifications can be made therein without departing from the spirit and scope thereof.

What is claimed is:

1. Transfer paper for electrophotography comprising:

base paper; and a coating layer provided on at least one side of said base paper, wherein said coating layer comprises a pigment and a binder, has a solid content in the range of 2 to 10 $g/m^2$ per side, and has first areas containing no voids having a equivalent circle diameter equal to or more than 1 μm and second areas containing voids having an equivalent circle diameter equal to or more than 1 μm;

wherein a proportion of said second areas having equivalent circle diameter more than 20 μm is equal to or less than 2%, and the average equivalent circle diameter of said second areas and that of said first areas, as observed on the surface of said coating layer, satisfy at least one of the following conditions:

(1) the average equivalent circle diameter of said second areas and that of said first areas are each from 1.5 to 10 μm;

(2) the average equivalent circle diameter of said second areas and that of said first areas are each 0.2 to 1.5 times the volume average particle size of the toner used for image formation; and (3) the average equivalent circle diameter of said second areas is from 1.0 to 10.0 μm and that of said first areas is from 1.5 to 10 μm.

2. Transfer paper for electrophotography as claimed in claim 1, wherein said second areas and said first areas alternate on the plane of the coating layer.

3. Transfer paper for electrophotography as claimed in claim 1, wherein said transfer paper has a surface resistivity of $1\times10^9$ to $5\times10^{11}$ Ω as measured according to JIS K6911.

4. Transfer paper for electrophotography as claimed in claim 1, wherein said base paper has a formation index equal to or more than 20.

5. Transfer paper for electrophotography as claimed in claim 4, wherein said base paper has an apparent density equal to or more than 0.8 $g/cm^3$.

6. Transfer paper for electrophotography as claimed in claim 5, wherein said transfer paper has a water content of 3.5 to 6% as a product.

7. Transfer paper for electrophotography as claimed in claim 5, wherein said transfer paper has a surface resistivity of $1\times10^9$ to $5\times10^{11}$ Ω.

8. Transfer paper for electrophotography as claimed in claim 4, wherein said transfer paper has a water content of 3.5 to 6% as a product.

9. Transfer paper for electrophotography as claimed in claim 8, wherein said transfer paper has a surface resistivity of $1\times10^9$ to $5\times10^{11}$ Ω.

10. Transfer paper for electrophotography as claimed in claim 4, wherein said transfer paper has a surface resistivity of $1\times10^9$ to $5\times10^{11}$ Ω.

11. Transfer paper for electrophotography as claimed in claim 1, wherein the pigment has an average particle size of from 1.5 to 10 μm.

12. Transfer paper for electrophotography comprising:

base paper; and a coating layer provided on at least one side of said base paper, wherein said coating layer comprises a pigment and a binder and has a solids content in the range of 2 to 10 $g/m^2$ per side, said coating layer having a 75° specular gloss of 1 to 15%;

wherein said pigment has an average particle size of 1.5 to 10 μm, said coating layer has void areas having an average diameter of 1.0 to 10 μm.

13. Transfer paper for electrophotography as claimed in claim 12, wherein a proportion of pigment particles having at least one of a sheet structure and a structure built up by tabular crystals is equal to or less than 70% by weight based on the total pigment particles.

14. Transfer paper for electrophotography as claimed in claim 13, wherein said average diameter of the voids in said void areas formed among the pigment particles is within a range of ±2 μm of said average particle size of said pigment.

15. Transfer paper for electrophotography as claimed in claim 13, wherein said transfer paper has a surface resistivity of $1\times10^9$ to $5\times10^{11}$ Ω.

16. Transfer paper for electrophotography as claimed in claim 12, wherein said average diameter of the voids in said void areas formed among the pigment particles is within a range of ±2 μm of said average particle size of said pigment.

17. Transfer paper for electrophotography as claimed in claim 16, wherein said transfer paper has a surface resistivity of $1\times10^9$ to $5\times10^{11}$ Ω.

18. Transfer paper for electrophotography as claimed in claim 12, wherein said transfer paper has a surface resistivity of $1\times10^9$ to $5\times10^{11}$ Ω.

* * * * *